(12) United States Patent
Schneider et al.

(10) Patent No.: US 10,462,156 B2
(45) Date of Patent: Oct. 29, 2019

(54) DETERMINING A REPUTATION OF DATA USING A DATA VISA

(71) Applicant: McAfee, LLC, Santa Clara, CA (US)

(72) Inventors: Michael Schneider, Paderborn (DE); Paul Gartside, Buckinghamshire (GB); David Oxley, Aylesbury (GB); Ramon Peypoch, San Carlos, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/494,723

(22) Filed: Sep. 24, 2014

(65) Prior Publication Data
US 2016/0087999 A1    Mar. 24, 2016

(51) Int. Cl.
*H04L 29/06* (2006.01)
*G06F 21/56* (2013.01)

(52) U.S. Cl.
CPC ........ *H04L 63/1408* (2013.01); *G06F 21/562* (2013.01)

(58) Field of Classification Search
CPC ............................ H04L 63/104; H04L 67/306
USPC .................................................. 726/1, 11, 22
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,611,925 B1 | 8/2003 | Spear | |
| 7,506,155 B1 | 3/2009 | Stewart et al. | |
| 2002/0016925 A1 | 2/2002 | Pennec et al. | |
| 2005/0210533 A1 | 9/2005 | Copeland et al. | |
| 2006/0182119 A1* | 8/2006 | Li | H04L 12/5695 370/395.52 |
| 2007/0083930 A1 | 4/2007 | Dumont et al. | |
| 2007/0088713 A1* | 4/2007 | Baxter | G06F 17/30867 726/1 |
| 2007/0203852 A1 | 8/2007 | Cameron et al. | |
| 2008/0005223 A1 | 1/2008 | Flake et al. | |
| 2008/0086417 A1* | 4/2008 | Bykov | G06Q 20/102 705/40 |

(Continued)

FOREIGN PATENT DOCUMENTS

| | | |
|---|---|---|
| KR | 10-2013-0116418 A | 10/2013 |
| RU | 2008134467 A | 2/2010 |

(Continued)

OTHER PUBLICATIONS

International Search Report and Written Opinion in International Application No. PCT/US2015/046824, dated Dec. 24, 2015, 12 pages.

(Continued)

*Primary Examiner* — Haresh N Patel
(74) *Attorney, Agent, or Firm* — Patent Capital Group

(57) ABSTRACT

Particular embodiments described herein provide for an electronic device that can be configured to receive data in a data flow, extract a data visa from the data flow, wherein the data visa is related to the data, and determine a reputation of the data from the data visa. The data visa can include reputation determination information obtained by previous network elements in the data flow. In addition, the electronic device can update the data visa, and communicate the updated data visa and data to a next network element in the data flow.

22 Claims, 8 Drawing Sheets

(56) References Cited

U.S. PATENT DOCUMENTS

| | | | |
|---|---|---|---|
| 2009/0165092 A1* | 6/2009 | McNamara | G06Q 20/3224 726/4 |
| 2009/0254663 A1* | 10/2009 | Alperovitch | H04L 45/02 709/227 |
| 2010/0082758 A1* | 4/2010 | Golan | G06Q 10/107 709/206 |
| 2010/0268731 A1* | 10/2010 | Roytman | G06Q 30/0243 707/769 |
| 2010/0287262 A1* | 11/2010 | Elzur | H04L 41/5054 709/220 |
| 2010/0317420 A1* | 12/2010 | Hoffberg | G06Q 30/0207 463/1 |
| 2011/0137789 A1* | 6/2011 | Kortina | G06Q 20/405 705/38 |
| 2011/0307474 A1* | 12/2011 | Hom | G06F 17/30545 707/723 |
| 2012/0084441 A1 | 4/2012 | Alperovitch et al. | |
| 2012/0233656 A1* | 9/2012 | Rieschick | H04L 63/1441 726/1 |
| 2012/0290427 A1* | 11/2012 | Reed | G06Q 50/01 705/26.2 |
| 2012/0324585 A1 | 12/2012 | Beckett, III et al. | |
| 2013/0036466 A1* | 2/2013 | Penta | H04L 63/102 726/22 |
| 2013/0097660 A1* | 4/2013 | Das | H04L 63/10 726/1 |
| 2013/0138591 A1* | 5/2013 | Ricci | G06F 9/54 706/46 |
| 2013/0254880 A1* | 9/2013 | Alperovitch | G06F 21/51 726/22 |
| 2013/0273968 A1* | 10/2013 | Rhoads | G06F 17/30244 455/556.1 |
| 2013/0315077 A1* | 11/2013 | Toshiaki | H04W 24/08 370/252 |
| 2014/0143825 A1* | 5/2014 | Behrendt | G06F 21/552 726/1 |
| 2014/0223573 A1* | 8/2014 | Reedy | G06F 21/6218 726/26 |
| 2014/0257972 A1* | 9/2014 | Chittilappilly | G06Q 30/0246 705/14.45 |
| 2014/0282867 A1* | 9/2014 | Choi | H04L 61/1511 726/3 |
| 2014/0293787 A1* | 10/2014 | Bourdelles | H04W 28/021 370/235 |
| 2015/0128267 A1* | 5/2015 | Gupta | H04L 63/145 726/23 |
| 2015/0138973 A1* | 5/2015 | Kumar | H04L 45/12 370/235 |
| 2015/0256431 A1* | 9/2015 | Buchanan | H04L 63/1408 709/224 |
| 2016/0043940 A1* | 2/2016 | Mahadevan | H04L 45/566 709/223 |
| 2016/0050131 A1* | 2/2016 | Zhang | H04L 43/0811 370/244 |

FOREIGN PATENT DOCUMENTS

| | | |
|---|---|---|
| WO | 2012164336 A1 | 12/2012 |
| WO | 2016048543 A1 | 3/2016 |

OTHER PUBLICATIONS

EPO May 8, 2018 Extended European Search Report from counterpart European Application 15843225.2; 6 pages.

RU Apr. 18, 2018—First Office Action from counterpart RU Application 2017105496 (PCT/US2015/046824); p. 1.

* cited by examiner

DETERMINING A REPUTATION OF DATA USING A DATA VISA

TECHNICAL FIELD

This disclosure relates in general to the field of information security, and more particularly, to determining the reputation of data.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information. Hence, significant administrative challenges remain for protecting computers and computer networks from malicious and inadvertent exploitation by malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
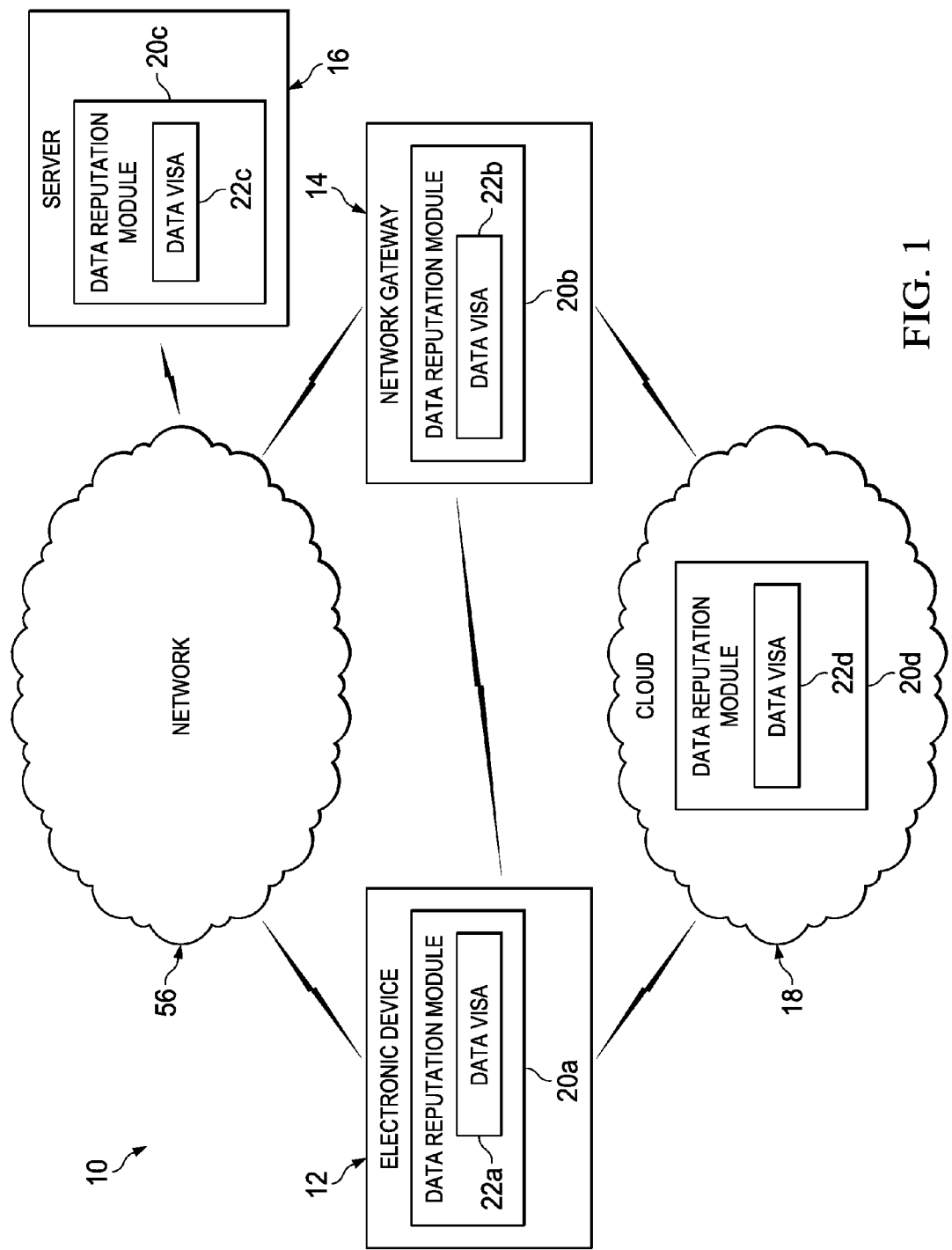
FIG. 1 is a simplified block diagram of a communication system for determining the reputation of data in accordance with an embodiment of the present disclosure.

FIG. 1 is a simplified block diagram of a communication system for determining the reputation of data in accordance with an embodiment of the present disclosure. Communication system 10 can include an electronic device 12, a network gateway 14, a security server 16, and a cloud 18. Electronic device 12 can include a data reputation module 20a. Data reputation module 20a can include a data visa 22a. Network gateway 14 can include a data reputation module 20b. Data reputation module 20b can include a data visa 22b. Security server 16 can include a data reputation module 20c. Data reputation module 20c can include a data visa 22c. Cloud 18 can include a data reputation module 20d. Data reputation module 20d can include a data visa 22d. Electronic device 12, security server 16, and cloud 18 can be connected through network 56. Electronic device 12 may be connected to network 56 through network gateway 14.

In example embodiments, communication system 10 can be configured to to provide a holistic view on data and have the ability to interpret both actual content and meta data. Each network element (e.g., electronic device 12, network gateway 14, security server 16, cloud 18, etc.) or touchpoint in a data flow can make decisions regarding the reputation of data and store the information in a data visa (e.g., data visas 22a, 22b, 22c, and 22d) that is communicated with the data in the data flow. The data visa can be used by a network element to take other network elements' decisions into account when making decisions regarding the reputation of the data. The reputation of the data can be used by the system when determining whether to block or allow the data in the data flow or communication flow. The reputation of the data can also be used by other processes outside of the scope of this disclosure. For example, the reputation of the data may be used by a security system to identify malware.

Elements of FIG. 1 may be coupled to one another through one or more interfaces employing any suitable connections (wired or wireless), which provide viable pathways for network (e.g., network 56) communications. Additionally, any one or more of these elements of FIG. 1 may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of illustrating certain example techniques of communication system 10, it is important to understand the communications that may be traversing the network environment. The following foundational information may be viewed as a basis from which the present disclosure may be properly explained. Current security filters in various systems deliver an unholistic conclusion on blocking or allowing data in a communication or data flow. For example a firewall can allow or deny traffic based on an IP address and port combination. However, this is only an isolated look on the data as only a limited amount of information is used for concluding the reason to block the data and a holistic view on the data is not available. In addition, existing solutions only look at data for which they are responsible and do not largely take the conclusion of other devices into consideration for their decisions. This can lead to over blocking as the data, while being suspicious from a single point of view, can be legitimate data when taking the whole flow of communication and additional information into consideration. The alternative is also possible, as a legitimate communication might be worth blocking if it is part of an illegitimate process. What is needed is a system that can determine a reputation of data in a holistic manner.

A communication system for determining the reputation of data, as outlined in FIG. 1, can resolve these issues (and others). In communication system 10 of FIG. 1, to determine the reputation of data, the system may be configured to include a system where different network elements (or touchpoints) can scan and analyze the data while it traverses through a network and can store the results in a data visa to create a holistic multi-layer data reputation. The system can provide a holistic view on the data and has the ability to work on both actual content and take additional abstract meta data of the communication into account. Further, multiple devices in a network can be enabled to submit their observations to a central storage or data visa to hold the different opinions about the quality of the data and create a multi-layer data reputation. This process can provide improved data reputation analysis as the system can take the results from different stages and layers in a network into consideration.

In addition, the system can take meta data of the profile of a user. The meta data can include job role and relevance to the data requested (e.g., title, role, etc.), geo-location of the user (subject to policy and privacy restrictions), historic geo-locations, historic data use profile (e.g., a comparison of quality and quantity of data being requested), etc. For example, a military data analyst may routinely accesses between 20 and 50 sensitive documents a day. This forms the historic profile (or one aspect of it) and while access to those documents from another user might trigger an alert, the access by the military data analyst does not trigger an alert. However, if the military data analyst starts to access a substantially more amount of sensitive documents, this could trigger either an alert or additional security clearance steps. Also, if the geolocation of a user suddenly changes or the type or classification of data changes, alerts may be triggered or additional controls may be set up (subject to granular policy configuration). In addition the system can also monitor 'usage creep' where sudden changes in data volume are intentionally obfuscated by a slow increase in user consumption over time, this is where a historic data usage profile could provide additional protection. Meta data related to a user can be fed into the data visa to provide both a historic access record and relational data view of what is being requested and by who, which is in itself a control area as some data should be accessed in close proximity and other data would absolutely not be accessed in the same context In a specific example, a user may download data onto an endpoint from a business partner's endpoint. A host intrusion prevention system (IPS) on the business partner's endpoint can detect that the communication is generally allowed and can enter a neutral reputation into a data visa that is communicated along with the data. A web gateway can check the category of the data and other values such as a destination of the data, can determine that the destination can be trusted, and can enter a positive reputation into the data visa. A firewall may determine that the Internet protocol (IP) address of the source of the data is a legitimate source and a trusted partner and can enter a positive reputation into the data visa. An IPS in the communication path may not detect anything malicious and can enter a neutral reputation into the data visa. A web gateway can determine that the document type is generally allowed, no virus is found, and can enter a positive reputation into the data visa. A data reputation module (e.g., data reputation module 20a) on the user's endpoint can check all the values in the data visa and determine, due to the positive overall rating, that the data has a good reputation and access to the data can be granted. At one or more points along the data flow, the data visa may be validated. Validating the data visa can include synchronizing the data visa with previous known data visas and meta data to validate the data visa. Validating the data ensures that the data visa has not been maliciously tampered with or altered.

In an alternate specific example, an edge firewall may determine that an aspect of the data is suspicious, but not suspicious enough to block the communication immediately (e.g., a country of origin for a server that is on the communication path may be suspicious) and may enter a suspect reputation into the data visa. An IPS in the communication path can inspect the data for anomalies and may determine that an aspect of the data is suspicious, but not suspicious enough on its own to block the communication immediately and add a suspect reputation into the data visa. If the cumulative reputation of the data meets a certain threshold, a device might block the data immediately, whereas if the reputation of the data was determined in isolation at network elements in an unholistic manner, then the data may not have been blocked.

In each of the above examples, only meta information of the data and communication was inspected and no content scanning had been applied. The meta information or meta data can include aspects of the data such as the uniform resource locator (URL) category, country of origin for the server, etc. This allows the reputation view on the data to be enriched significantly as the data travels along the communication path and the overall system can rated the data under different aspects before content scanning is applied. At any point along the communication path of the data, a look at the data content may be possible and the system may perform data loss prevention (DLP), virus scanning, or some other data content scanning. However, the data content scanning is optional as multiple devices along the data path have analyzed the data and have determined a reputation which could be used for bypassing certain security filters, or, could lead to blocking the communication before data content scanning is use. The calculation of the reputation of the data may be done on several ways. Network elements could, for instance, select which reputations from other network elements along the data patch they would like to take into account or let a central storage provide an overall value. For example a reputation calculation that includes four different network elements may be based on a Bayesian algorithm. More specifically, a formula of PROB $(a,b,c,d)=(abcd)/(abcd+(1-a)(1-b)(1-c)(1-d))$ could be used where the variables a, b, c, and d are values retrieved from different network elements and represent a reputation score. A less than 0.5 score can represent that the data is suspicious, a 0.5 can be a neutral score, and a score above 0.5 can indicate that the data is acceptable.

Turning to the infrastructure of FIG. 1, communication system 10 in accordance with an example embodiment is shown. Generally, communication system 10 can be implemented in any type or topology of networks. Network 56 represents a series of points or nodes of interconnected communication paths for receiving and transmitting packets of information that propagate through communication system 10. Network 56 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 10, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 12, network gateway 14, security server 16, and cloud 18 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 10, each of electronic device 12, network gateway 14, security server 16, and cloud 18 can include memory elements for storing information to be used in the operations outlined herein. Each of electronic device 12, network gateway 14, security server 16, and cloud 18 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as electronic device 12, network gateway 14, security server 16, and cloud 18 may include software modules (e.g., data reputation modules 20a, 20b, 20c, and 20d respectively) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 12, network gateway 14, security server 16, and cloud 18 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
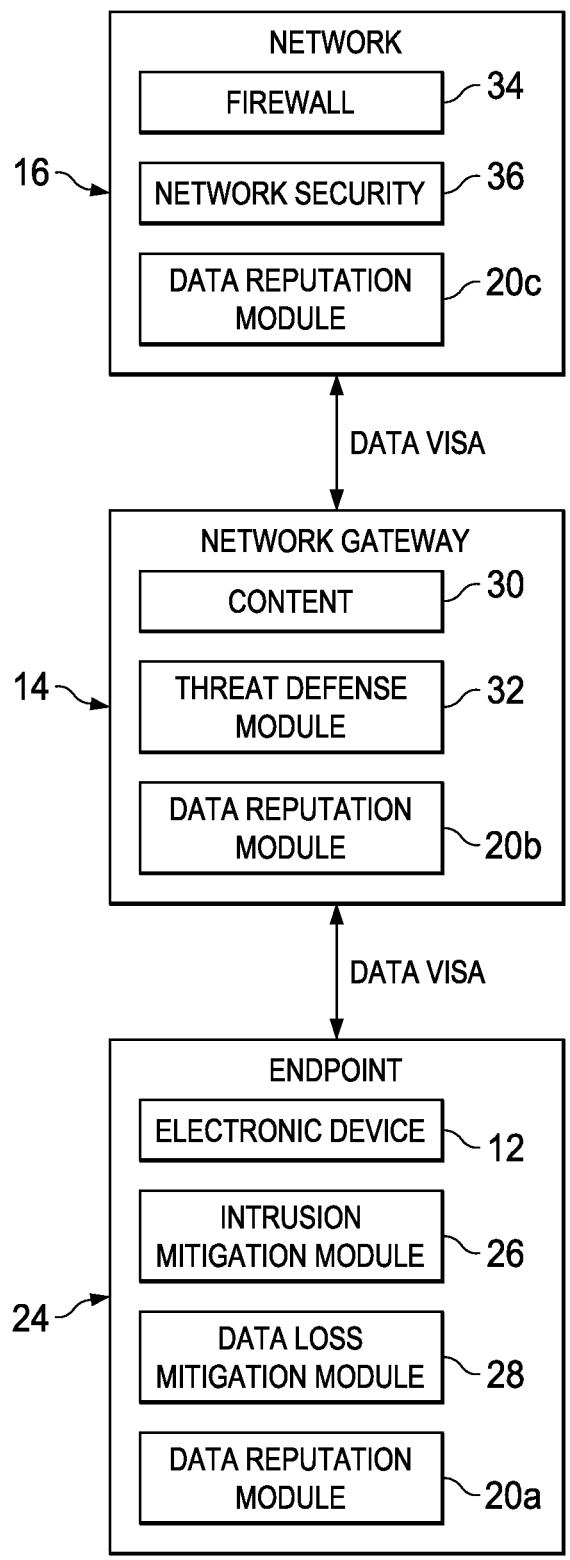
FIG. 2 is a simplified block diagram of a portion of a communication system for the determining the reputation of data in accordance with an embodiment of the present disclosure.

Electronic device 12 can be a network element and includes, for example, desktop computers, laptop computers, mobile devices, personal digital assistants, smartphones, tablets, or other similar devices. Security server 16 can be a network element such as a server or virtual server and can be associated with clients, customers, endpoints, or end users wishing to initiate a communication in communication system 10 via some network (e.g., network 56). The term 'server' is inclusive of devices used to serve the requests of clients and/or perform some computational task on behalf of clients within communication system 10. Although data reputation module 20a is represented as being located in electronic device 12, data reputation module 20b is represented as being located in network gateway 14, data reputation module 20c is represented as being located in security server 16, and data reputation module 20d is represented as being located in cloud 18, this is for illustrative purposes only. Each data reputation module 20a, 20b, 20c, and 20d could be combined or separated in any suitable configuration. Furthermore, each data reputation module 20a, 20b, 20c, and 20d could be integrated with or distributed in another network. Cloud 18 is configured to provide cloud services to electronic device 12. Cloud services may generally be defined as the use of computing resources that are delivered as a service over a network, such as the Internet. Typically, compute, storage, and network resources are offered in a cloud infrastructure, effectively shifting the workload from a local network to the cloud network Turning to FIG. 2, FIG. 2 is a simplified block diagram of a portion of a communication system 10 for determining the reputation of data in accordance with an embodiment of the present disclosure. An endpoint 24 could include electronic device 12, data reputation module 20a, a data loss mitigation module 28, and an intrusion mitigation module 26. Data reputation module 20a, data loss mitigation module 28, and intrusion mitigation module 26 could be combined or separated in any suitable configuration and may each be located in electronic device 12. Data loss mitigation module 28 can be configured to perform data loss mitigation and enhance the data reputation analysis done by data reputation module 20a. Intrusion mitigation module 26 can be configured to perform host intrusion mitigation, virus scans, and also enhance the data reputation analysis done by data reputation module 20a Network gateway 14 can include data reputation module 20b, content 30, and threat defense module 32. Content 30 can be configured to extract Layer-7 information such as identifying communication partners or network elements. Threat defense module 32 can be configured to perform malware detection at network gateway 14. Network 56 can include data reputation module 20c, a firewall 34, and network security 36. At each of endpoint 24, network gateway 14, and security server 16, meta data related to the data can be extracted and added to the data visa associated with the data. In addition, the data visa can be analyzed to determine a reputation of the data associated with data visa.

Figure 3:
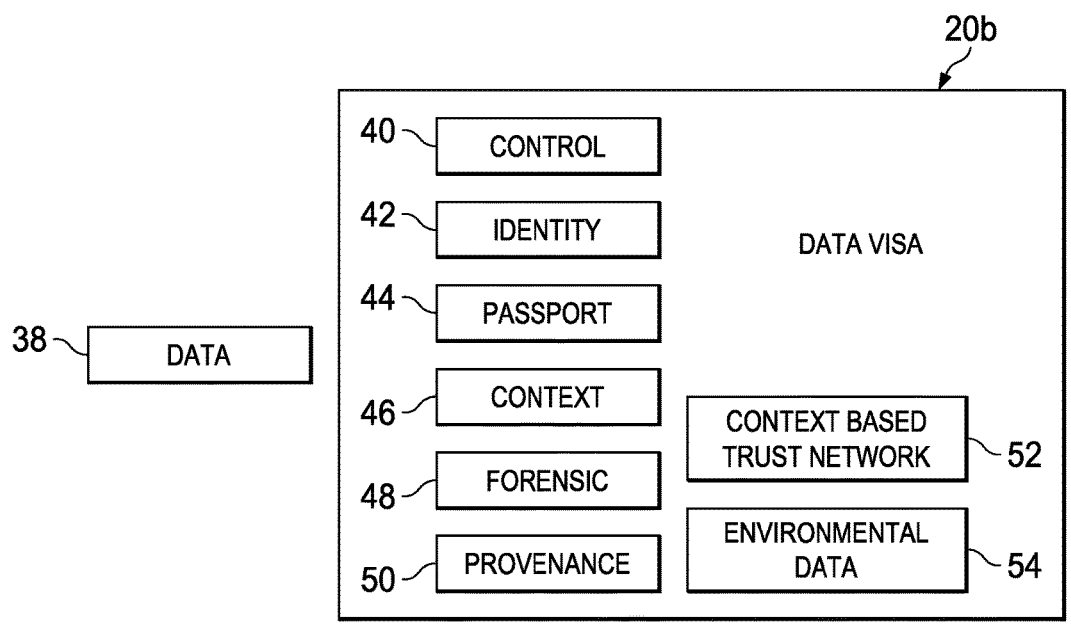
FIG. 3 is a simplified block diagram illustrating example details of determining the reputation of data in accordance with an embodiment of the present disclosure.

Turning to FIG. 3, FIG. 3 FIG. 3 is a simplified diagram of a portion of a communication system 10 for determining the reputation of data in accordance with an embodiment of the present disclosure. FIG. 3 illustrates communications that may be flowing in communication system 10 and includes data 38 and data visa 22b. Data visa 22b can include control information 40, identity information 42, passport information 44, context information 46, forensic information 48, provenance information 50, context based trust network information 52, and environmental data information 54. Data 38 can include the information (e.g., document, spreadsheet, picture, etc.) that is being communicated in communication system 10. Control information 40, identity information 42, passport information 44, context information 46, forensic information 48, provenance information 50, context based trust network information 52, and environmental data information 54 are attributes of data 38 that can be included in data visa 22b and can help determine the reputation of data 38.

Control information 40 can include a predefined action related to data 38 such as if a certain event or transaction happens then an action occurs (e.g., if data 38 is sent outside of a secure network, then the transmission is blocked). Identity information 42 can include where data 38 originated or information about the user or device that originated data 38. Passport information 44 can include a collection of previously obtained attributes about data 38. Context information 46 can include information related to data 38 that may help to explain the overall reputation of data 38. Forensic information 48 can include information related to the flow of data 38 including the origin, destination, and general environment and chain of the data flow. Provenance information 50 can include reputation information about the origin of data 38 such as whether or not data 38 originated from a trusted corporate file share or an untrusted thumb drive. Context based trust network information 52 can include information related to the reputation of the network or networks used when communicating data 38. Environmental data information 54 can include environmental information related to data 38 such as if data 38 originated on a server, the operating system used to originate data 38, etc.

Figure 4:
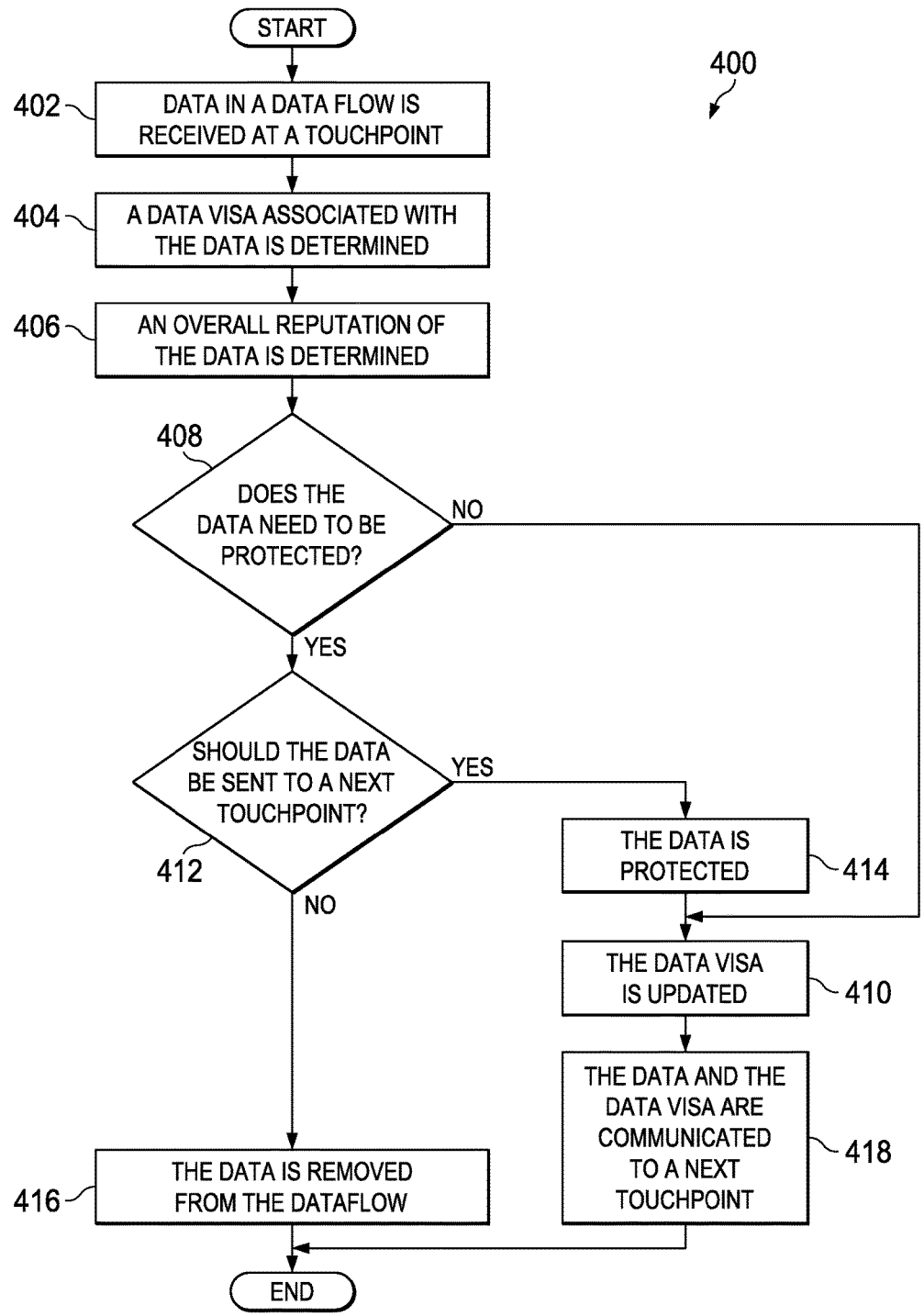
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with determining the reputation of data, in accordance with an embodiment. In an embodiment, one or more operations of flow 400 may be performed by one or more of data reputation modules 20a, 20b, 20c, or 20d. At 402, data in a data flow is received at a touchpoint (e.g., a network element). In an example, the touchpoint may be electronic device 12, network gateway 14, security server 16, or cloud 18. At 404, a data visa associated with the data is determined. In an example, the data visa is included in the data flow received at the touchpoint and can be stored in memory at the touchpoint. At 406, an overall reputation of the data is determined. In an example, data reputation modules 20a, 20b, 20c, or 20d can determine the overall reputation of the data.

At 408, the system determines if the data needs to be protected. If the data does not need to be protected, then the data visa is updated as in 410 and the data and data visa are communicated to a next touchpoint, as in 418. If the system determines that the data needs to be protected, then the system determines if the data should be sent to a next touchpoint, as in 412. If the system determines that the data should not be sent to a next touchpoint, then the data is removed from the data flow, as in 416. For example, if the data is untrustworthy, then the data should not be sent to the next touchpoint and can be removed from the data flow. If the data should be sent to a next touchpoint, then the data is protected, as in 412. For example, this could include encrypting the data or putting a passcode lock on the data. At 410, the data visa is updated and the data and the data visa are communicated to a next touchpoint, as in 418.

Figure 5:
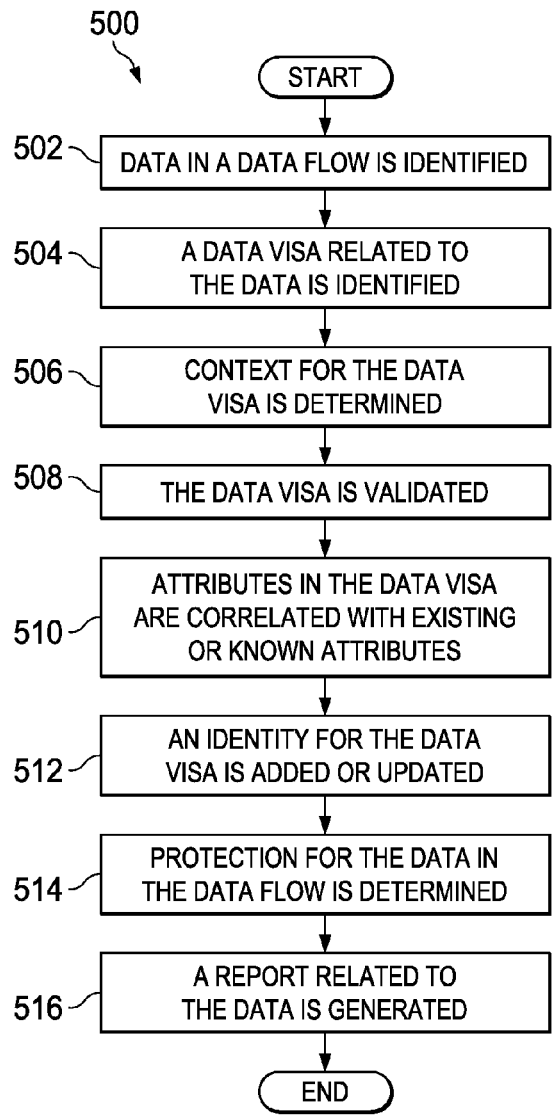
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with determining the reputation of data, in accordance with an embodiment. In an embodiment, one or more operations of flow 500 may be performed by one or more of data reputation modules 20a, 20b, 20c, or 20d. At 502, data in a data flow is identified. At 504, a data visa related to the data is identified. At 506, context for the data visa is determined. For example, the context may include a server who's operating system is out of data or old and prone or susceptible to malicious attacks. At 508, the data visa is validated. For example, validating the data visa may include synchronizing the data visa with previous known data visas and meta data to validate the data visa. Validating the data ensures that the data visa has not been maliciously tampered with or altered. At 510, attributes in the data visa are correlated with existing of known attributes. For example, a server included in the data flow may be a known malicious server or a known safe and trusted server. At 512, an identity for the data visa is added or updated. At 514, protection for the data in the data flow is determined. At 516, a report related to the data is generated. The report can be communicated to security server 16 or cloud 18 for analysis.

Figure 6:
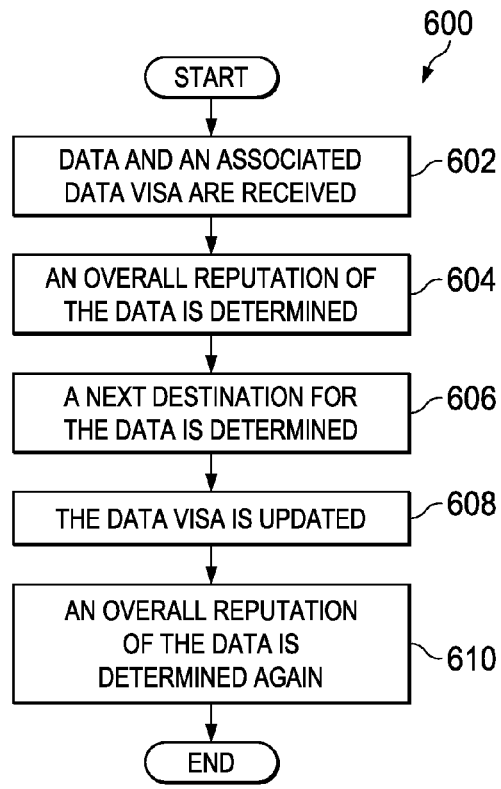
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with determining the reputation of data, in accordance with an embodiment. In an embodiment, one or more operations of flow 600 may be performed by one or more of data reputation modules 20a, 20b, 20c, or 20d. At 602, data and an associated data visa are received. At 604, an overall reputation of the data is determined. At 606, a next destination for the data is determined. At 608, the data visa is updated. At 610, an overall reputation of the data is determined again. By determining an overall reputation of the data after the next destination for the data is determined, a better understanding of the reputation of the data can be obtained.

Figure 7:
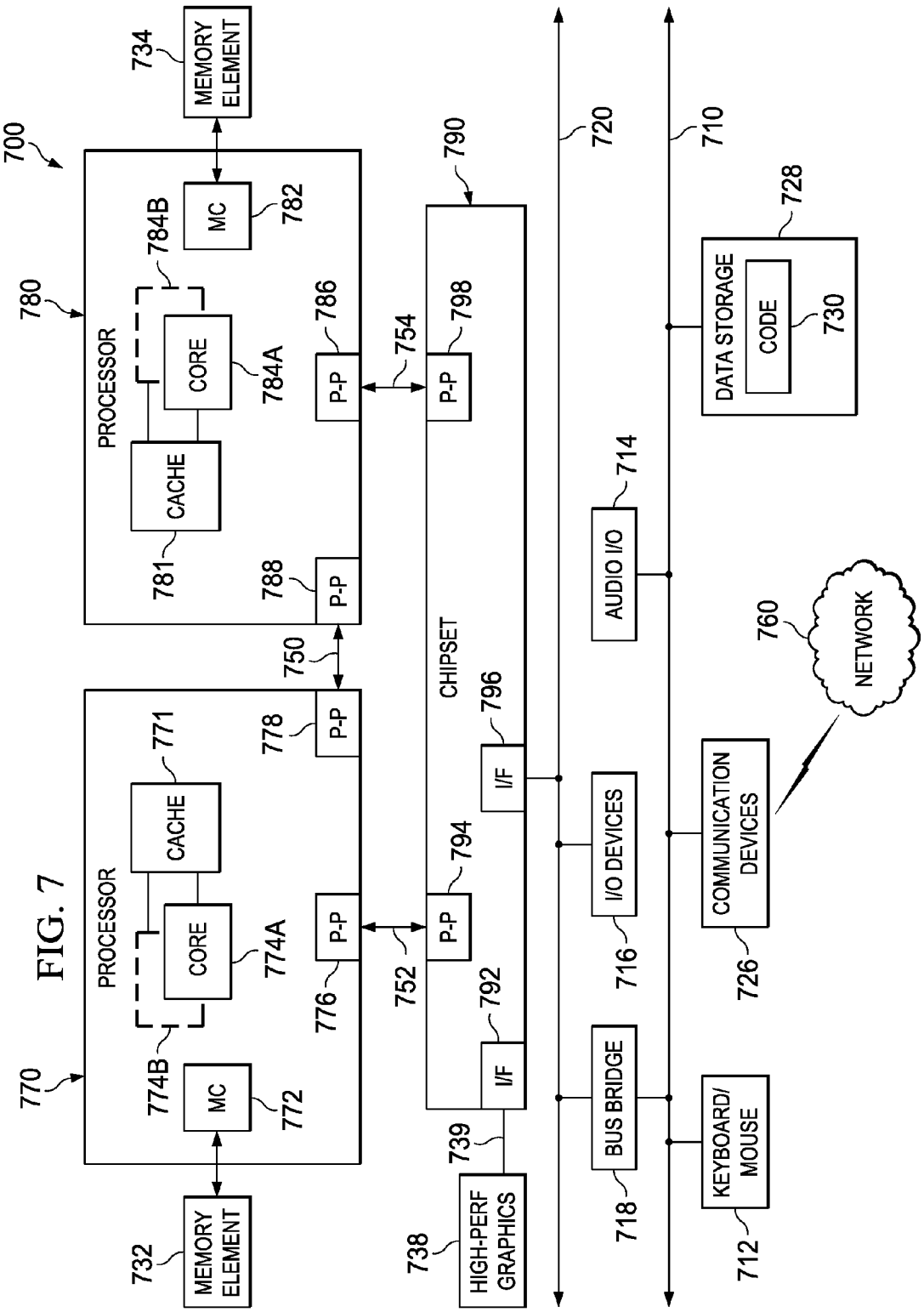
FIG. 7 is a block diagram illustrating an example computing system that is arranged in a point-to-point configuration in accordance with an embodiment.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 100 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 4-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor, and may exchange data via a point-to-point (PtP) interface 750 using point-to-point interface circuits 778 and 788, respectively. Processors 770 and 780 may each exchange data with a control logic 790 via individual point-to-point interfaces 752 and 754 using point-to-point interface circuits 776, 786, 794, and 798. Control logic 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Control logic 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
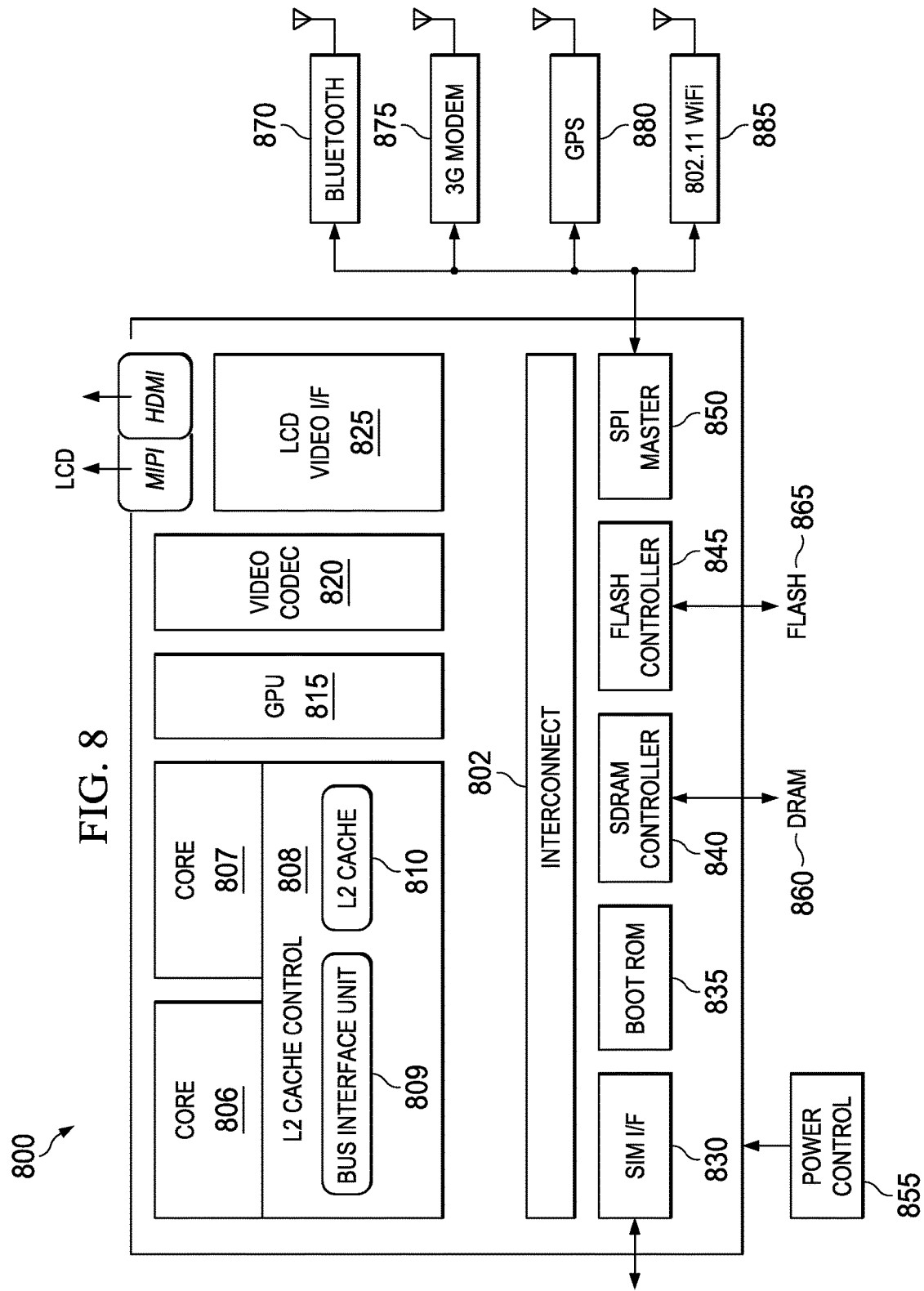
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the determining of a reputation for data features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 9:
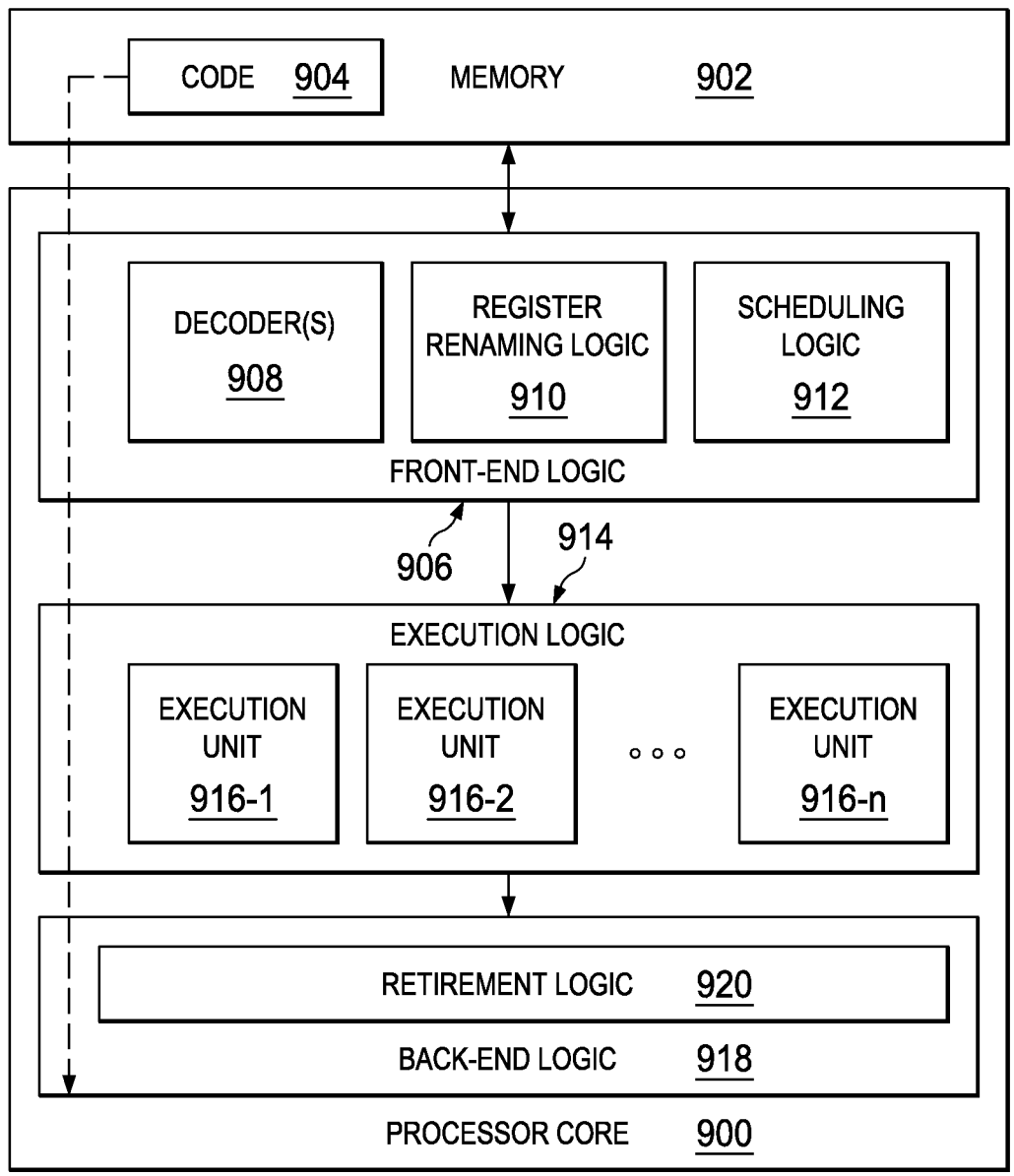
FIG. 9 is a block diagram illustrating an example processor core in accordance with an embodiment.

FIG. 9 illustrates a processor core 900 according to an embodiment. Processor core 9 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents an embodiment of processors cores 774a, 774b, 784a, and 784b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 4-6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor cause the at least one processor to receive data in a data flow, extract a data visa from the data flow, where the data visa is related to the data, and determine a reputation of the data from the data visa.

In Example C2, the subject matter of Example C1 can optionally include where the data visa includes reputation determination information obtained by previous network elements in the data flow.

In Example C3, the subject matter of any one of Examples C1-C2 can optionally include where the instructions, when executed by the at least one processor, further cause the at least one processor to update the data visa, and communicate the updated data visa and data to a next network element in the data flow.

In Example C4, the subject matter of any one of Examples C1-C3 can optionally include where the instructions, when executed by the at least one processor, further cause the at least one processor to remove the data from the data flow based on the determined reputation of the data from the data visa.

In Example C5, the subject matter of any one of Examples C1-C4 can optionally include where the data visa is validated.

In Example C6, the subject matter of any one of Example C1-C5 can optionally include where the data visa includes meta data related to the data.

In Example C7, the subject matter of any one of Examples C1-C6 can optionally include where the reputation of the data is determined from meta data included in the data visa.

In Example C8, the subject matter of any one of Examples C1-C7 can optionally include where the instructions, when executed by the at least one processor, further cause the at least one processor to determine a next network element in the data flow, update the data visa to include information related to the next network element, and redetermine a new reputation of the data from the updated data visa.

In Example A1, an apparatus can include a data reputation module, where the data reputation module is configured to extract a data visa from a data flow, where the data visa is related to data in the data flow, and determine a reputation of the data from the data visa, where the data visa includes reputation determination information obtained by previous network elements in the data flow.

In Example, A2, the subject matter of Example A1 can optionally include where the data reputation module is further configured to update the data visa and communicate the updated data visa and data to a next network element in the data flow.

In Example A3, the subject matter of any one of Examples A1-A2 can optionally include where the data reputation module is further configured to remove the data from the data flow based on the determined reputation of the data from the data visa.

In Example A4, the subject matter of any one of Examples A1-A3 can optionally include where the data visa is validated.

In Example A5, the subject matter of any one of Examples A1-A4 can optionally include where the data visa includes meta data related to the data.

In Example A6, the subject matter of any one of Examples A1-A5 can optionally include where the reputation of the data is determined from meta data included in the data visa.

In Example A7, the subject matter of any one of Examples A1-A6 can optionally include where attributes of the data visa are correlated with known attributes of known data visas.

In Example A8, the subject matter of any one of Examples A1-A7 can optionally include where the data reputation module is further configured to determine a next network element in the data flow, update the data visa to include information related to the next network element, and redetermine a new reputation of the data from the updated data visa.

Example M1 is a method including receiving data in a data flow, extracting a data visa from the data flow, where the data visa is related to the data, and determining a reputation of the data from the data visa.

In Example M2, the subject matter of Example M1 can optionally include where the data visa includes reputation determination information obtained by previous network elements in the data flow.

In Example M3, the subject matter of any one of the Examples M1-M2 can optionally include updating the data visa and communicating the updated data visa and data to a next network element in the data flow.

In Example M4, the subject matter of any one of the Examples M1-M3 can optionally include removing the data from the data flow based on the determined reputation of the data from the data visa.

In Example M5, the subject matter of any one of the Examples M1-M4 can optionally include where the data visa is validated.

In Example M6, the subject matter of any one of the Examples M1-M5 can optionally include where the reputation of the data is determined from meta data included in the data visa.

In Example M7, the subject matter of any one of the Examples M1-M6 can optionally include determining a next network element in the data flow, updating the data visa to include information related to the next network element, and redetermining a new reputation of the data from the updated data visa.

Example S1 is a system for determining a reputation of data, the system including a data reputation module configured for receiving data in a data flow, extracting a data visa from the data flow, where the data visa is related to the data, where the data visa includes reputation determination information obtained by previous network elements in the data flow, and determining a reputation of the data from the data visa.

In Example S2, the subject matter of Example S1 can optionally include the data reputation module being further configured for updating the data visa and communicating the updated data visa and data to a next network element in the data flow.

In Example S3, the subject matter of any of the Examples S1-S2 can optionally include the detection module being further configured to determine if the program is associated with a child program, determine a number of child events to be traced if the program is associated a child program, combine any traced child events with the traced events, and analyze one or more results of the traced events to determine if the process includes malware Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one computer-readable medium comprising one or more instructions that, when executed by at least one processor, perform a method comprising:
   receiving data in a data flow;
   extracting a data visa from the data flow, wherein the data visa travels with the data through the data flow and includes reputation determination information from at least one previous hop network element in the data flow;
   bypassing a security filter based on the reputation determination information;
   determining a reputation of the data based on the data and the reputation determination information, wherein the reputation of the data is determined from meta data included in the data visa, and the meta data includes a title or role of a user, a geo-location of the user, or a historic data use profile of the user;
   storing the reputation of the data in the data visa; and
   communicating the data visa and the data to a next network element in the data flow.

2. The at least one computer-readable medium of claim 1, wherein the data visa includes information related to the data flow including an origin, a destination, and chain of the data flow.

3. The at least one computer-readable medium of claim 1, the method further comprising:
synchronizing the data visa with previous known data visas to validate the data visa.

4. The at least one computer-readable medium of claim 1, the method further comprising:
determining, for the data visa, a context indicating whether a server that communicated the data has an operating system is vulnerable.

5. The at least one computer-readable medium of claim 1, wherein the data visa includes reputation determination information obtained by a plurality of previous hop network elements in the data flow.

6. The at least one computer-readable medium of claim 1, the method further comprising:
removing the data from the data flow based on the determined reputation of the data from the data visa.

7. The at least one computer-readable medium of claim 1, the method further comprising:
validating the data visa.

8. The at least one computer-readable medium of claim 1, the method further comprising:
determining the next network element in the data flow;
updating the data visa to include information related to the next network element; and
redetermining a new reputation of the data from the updated data visa.

9. An apparatus comprising:
a processor; and
a data reputation module configured to cause the processor to
extract a data visa from a data flow, wherein the data visa travels with data in the data flow through the data flow and includes reputation determination information from at least one previous hop network element in the data flow;
bypass a security filter based on the reputation determination information;
determine a reputation of the data based on the data and the reputation determination information, wherein the reputation of the data is determined from meta data included in the data visa, and the meta data includes a title or role of a user, a geo-location of the user, or a historic data use profile of the user;
store the reputation of the data in the data visa; and
communicate the data visa and the data to a next network element in the data flow.

10. The apparatus of claim 9, wherein the data reputation module is further configured to:
remove the data from the data flow based on the determined reputation of the data from the data visa.

11. The apparatus of claim 9, wherein the data visa is validated.

12. The apparatus of claim 9, wherein attributes of the data visa are correlated with known attributes of known data visas.

13. The apparatus of claim 9, wherein the data reputation module is further configured to:
determine the next network element in the data flow;
update the data visa to include information related to the next network element; and
redetermine a new reputation of the data from the updated data visa.

14. A method comprising:
receiving data in a data flow;
extracting a data visa from the data flow, wherein the data visa travels with the data through the data flow and includes reputation determination information from at least one previous hop network element in the data flow;
bypassing a security filter based on the reputation determination information;
determining a reputation of the data based on the data and the reputation determination information, wherein the reputation of the data is determined from meta data included in the data visa, and the meta data includes a title or role of a user, a geo-location of the user, or a historic data use profile of the user;
storing the reputation of the data in the data visa; and
communicating the data visa and the data to a next network element in the data flow.

15. The method of claim 14, wherein the data visa includes reputation determination information obtained by a plurality of previous hop network elements in the data flow.

16. The method of claim 14, further comprising:
removing the data from the data flow based on the determined reputation of the data from the data visa.

17. The method of claim 14, wherein the data visa is validated.

18. The method of claim 14, further comprising:
determining the next network element in the data flow;
updating the data visa to include information related to the next network element; and
redetermining a new reputation of the data from the updated data visa.

19. A system for determining a reputation of data, the system comprising:
a processor;
memory that includes one or more instructions; and
a data reputation module to execute the one or more instructions, the data reputation module configured for
receiving the data in a data flow;
extracting a data visa from the data flow, wherein the data visa travels with the data through the data flow, wherein the data visa includes reputation determination information from at least one previous hop network element in the data flow;
bypassing a security filter based on the reputation determination information;
determining a reputation of the data based on the data and the reputation determination information, wherein the reputation of the data is determined from meta data included in the data visa, and the meta data includes a title or role of a user, a geo-location of the user, or a historic data use profile of the user;
storing the reputation of the data in the data visa; and
communicating the data visa and the data to a next network element in the data flow.

20. The system of claim 19, wherein the meta data includes the title or role of the user, the geo-location of the user, and the historic data use profile of the user.

21. The system of claim 19, wherein the data reputation module rates the data before performing a data content scanning defined by data loss prevention (DLP) or virus scanning.

22. The system of claim 19, wherein the system encrypts the data or puts a passcode lock on the data prior to the communicating.

\* \* \* \* \*